Aug. 8, 1944.   C. F. CARLSON   2,355,145
WELDING APPARATUS
Filed Dec. 18, 1940
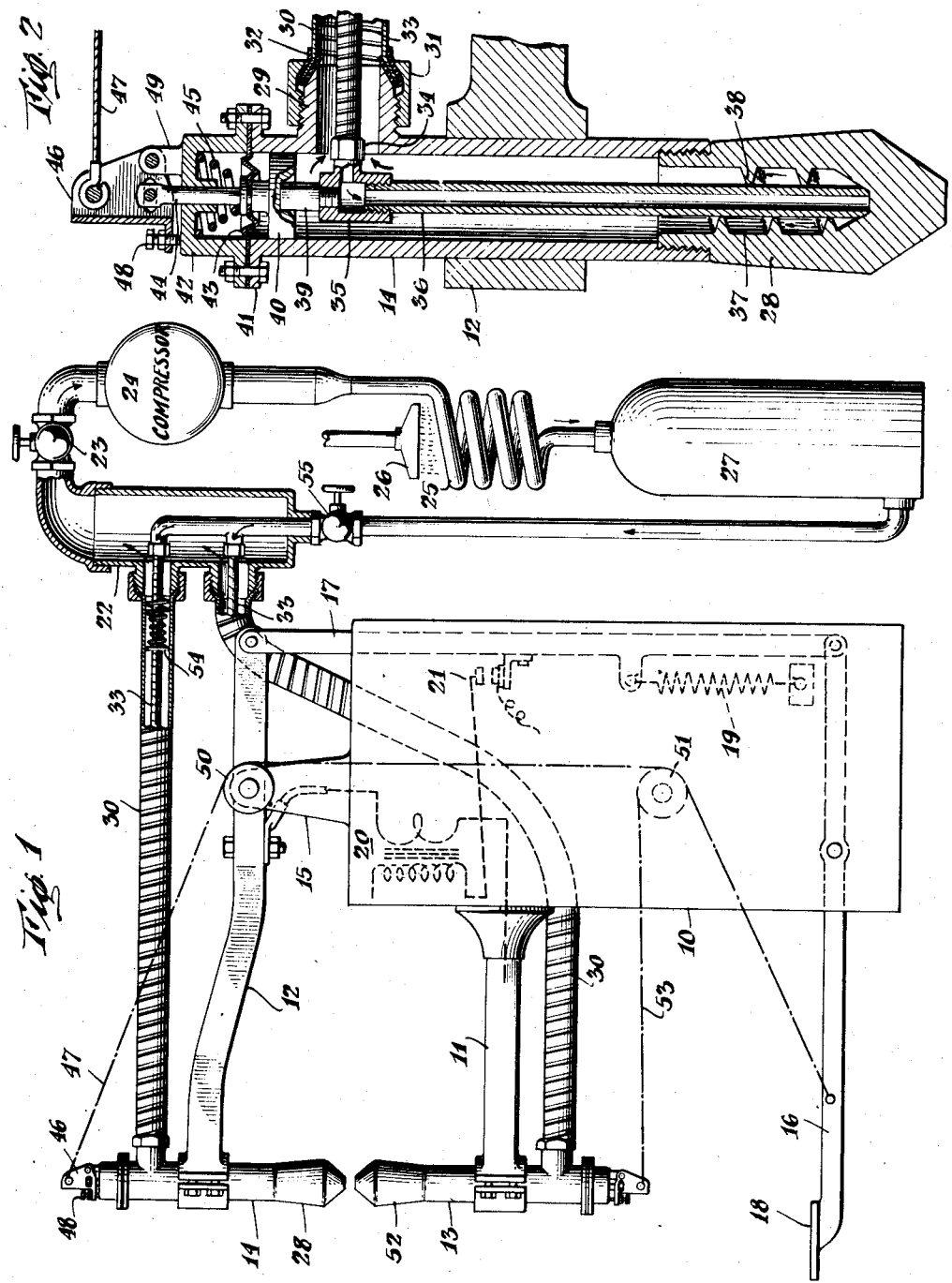
INVENTOR
Chester F. Carlson
BY
ATTORNEY Patented Aug. 8, 1944

2,355,145

UNITED STATES PATENT OFFICE 2,355,145

WELDING APPARATUS

Chester F. Carlson, Jackson Heights, N. Y., assignor to P. R. Mallory & Co., Inc., Indianapolis, Ind., a corporation of Delaware Application December 18, 1940, Serial No. 370,602

17 Claims. (Cl. 219—4)

This invention relates to electric resistance welding apparatus.

An object of the invention is to improve welding apparatus, particularly the cooling means therefor.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a side elevation, partly in section, of a resistance welding apparatus embodying features of the present invention, and Figure 2 is a section through one of the welding electrodes.

The purpose of resistance welding apparatus is ordinarily to apply pressure to the parts to be welded together and simultaneously to pass electric current through the joint where welding is to take place sufficient to heat the joint to a temperature at which the contacting surfaces of the parts to be welded are melted or softened and thereby welded together. In conventional lap welding, for example, two metal plates to be welded together are overlapped and clamped between the welding electrodes while an electric current is passed through the overlapped plates from one electrode to the other. In this instance, it is desired that welding shall take place at the contacting surfaces between the two plates. On the other hand, it is necessary that the temperature at the outer surfaces of the plates where they are engaged between the tips of the welding electrodes shall be kept below welding temperature to prevent sticking of the welding electrodes themselves to the plates.

There are, of course, additional reasons for keeping the temperature of the welding electrodes themselves substantially below the welding temperature. If the welding electrodes become overheated they may be softened, and when the welding pressure is applied, they will tend to spread at their ends or "mushroom." Moreover, it is important to have the welding electrodes of as high electrical conductivity as possible. Since the conductivity of most metals from which the welding electrodes are formed is higher, the lower the temperature, this affords another reason for maintaining the electrodes at as low a temperature as possible. It is also found that in welding certain metals the electrodes, as they become over-heated, tend to alloy with the metals being welded. This is, of course, undesirable since it often results in harm to the work itself, and also results in rapid deterioration of the welding electrodes.

It is often desirable also to cool the welded joint as rapidly as possible after welding has taken place in order to prevent spreading of the heat to other parts of the metal being worked upon.

The necessity for efficient cooling of the electrodes is more pronounced when welding certain metals. As is well known, water cooled welding electrodes give satisfactory operation for many welding operations. In the case of some metals such as aluminum, however, great difficulty has been experienced in carrying out a large number of welding operations in continuous production due to the tendency of the welding electrodes to stick to the work being welded and to deteriorate. For this reason, the welding of aluminum parts, such as airplane bodies and wing coverings, by resistance welding methods has not generally been resorted to in commercial practice.

So far as I know, all practical welding systems in use today utilize water cooling of the welding electrodes. It is obvious that by this method the electrodes can not be cooled much below room temperature and that they will normally be operated at much higher temperatures during continuous welding operations. Refrigerant cooling of welding electrodes, while desirable, presents many difficulties. Since the welding electrodes and the arms to which they are attached are usually formed of high conductivity metals, there is presented a difficult problem of thermal insulation if the electrodes are to be cooled substantially below room temperature. Not only does refrigerant cooling present the practical problem of thermal insulation, but the efficiency of the cooling system would be extremely low with conventional refrigerating methods due to the difficulty of concentrating the cooling at the welding tips where it is required.

The present invention contemplates apparatus for effecting refrigerant cooling of the welding electrodes in such a manner as to concentrate the cooling effect at the welding tips where it is required, resulting in a highly efficient cooling system and a minimum requirement for thermal insulation.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing, Figure 1 shows a welding machine comprising a supporting base 10 carrying a pair of welding electrode support arms 11 and 12 at the ends of which are clamped holders 13 and 14 holding cooperating welding electrodes 52 and 28 at their ends. Arm 11 is rigidly mounted on the base 10 and holds electrode holder 13 at its end projecting upwardly. Arm 12 is pivoted on a bracket 15 at the top of the base 10 so its free end carrying electrode holder 14 can be moved up and down to clamp the work to be welded between the electrode 28 and electrode 52. Movable arm 12 is controlled by a foot lever 16 connected to arm 12 by a link 17. Lever 16 carries a foot pedal 18 to enable the electrodes to be brought together under control of the foot of the operator. A spring 19 is provided to hold the electrode normally apart and a suitable step-down transformer 20 is provided to supply electric current to the work to be welded, the two ends of the transformer secondary being connected respectively to arms 11 and 12. A switch 21 controlled by foot lever 16 affords a means for closing the circuit when the electrodes are brought together. The apparatus so far described is largely conventional in construction and operation.

The cooling means for electrodes 52 and 28 comprises a compression type refrigerating system although it is contemplated that other types of refrigerating systems may likewise be used such as the absorption type. In the system shown, the uncompressed refrigerant fluid passes from header 22 through normally open valve 23 to compressor 24 where the gas is compressed. The compressed hot refrigerant is then led through the pipes of cooling tower 25 where the fluid is cooled by water spray 26 or other conventional methods. The compressed and cooled fluid, which at this step may be a liquid, then passes into compressed refrigerant storage tank 27 where it remains until used. The refrigerant fluid may be any of the refrigerating materials commonly used in such a system such as ammonia, the commercial refrigerant sold under the trade name Freon, or other well known refrigerants.

According to the present invention, the welding electrode itself comprises the expansion valve of the refrigerating system. This will appear more clearly by reference to Figure 2 wherein the cross section of electrode holder 14 and electrode 28 is illustrated. As shown in this figure, the electrode holder 14 comprises a hollow tubular body of highly conductive metal which is clamped at the end of arm 12 of the welding machine. The welding electrode 28 comprises a recessed tip of highly conductive metal such as copper, silver, or copper or silver base alloy which is screwed into the lower end of electrode holder 14. Holder 14 has a tubular side passage 29 extending therefrom near its upper end and a refrigerant hose such as a flexible seamless metal hose 30 or the like is connected to side passage 29 by sleeve 31. A layer of rubber or other insulating material 32 is interposed between the side arm 29 and hose 30 to prevent passage of electric current to the hose. Hose 30 comprises the return passage for expanded refrigerant fluid returning to the compressor. A smaller flexible seamless metal hose 33 or the like is located inside of hose 30 for carrying the compressed or liquefied refrigerant to the melding electrode. Hose 33 is connected by coupling 34 with a pipe joint 35 located inside of electrode holder 14, a layer of insulation being included in the coupling. A small pipe 36 within holder 14 is also connected with this coupling and extends downward in the holder and concentric therewith to the bottom of the recess 37 in the welding electrode 28. The lower end of pipe 36 and the bottom of recess 37 in the electrode are correspondingly formed to afford a tight fitting joint when pipe 36 is firmly pressed down in the recess in the electrode. The wall of recess 37 in the electrode is preferably provided with a spiral flange 38 to increase the surface of the electrode in heat-exchange relation with the refrigerant fluid and to increase the length of the path of travel of the refrigerant during the period of vaporization and expansion.

A solid metal plug 39 is also attached to pipe coupling 35 and extends upwardly toward the upper end of electrode holder 14 where it seats in a plunger 40 arranged to slide up and down inside the electrode holder. The upper end of the holder is provided with a flange 41 and a correspondingly flanged head 42 is bolted thereto, with a flexible metal diaphragm 43 therebetween to prevent escape of refrigerant fluid through the top of the electrode holder. Plunger 40 is provided with a centrally located, upwardly extending slide rod 44 which passes through diaphragm 43 and is clamped thereto and which passes on upward through the upper end of head 42. A spiral spring 45 of sufficient stiffness to overcome the pressure of the compressed refrigerant in pipe 36 encircles rod 44 inside head 42 and is biased to press plunger 40 downward to hold pipe 36 normally firmly seated in the bottom of the recess in electrode 28.

A rocker arm 46 is pivotally attached to a bracket 49 on the top of head 42 and to the upper end of rod 44 where it extends above the top surface of head 42. Rocker arm 46 is connected to an operating cable or chain 47 whereby it may be tilted when desired to raise rod 44 and its associated plunger 40 and thereby allow pipe 36 to move up slightly under the force of the compressed refrigerant and thereby permit refrigerant to escape from the lower end of pipe 36 and expand within electrode 28. An adjusting screw 48 is provided on cam lever 46 to adjust the position of the rocker arm and slide rod 44 in such a manner as to afford the desired seating of pipe 36 within the welding electrode. In some cases it may be desired, for example, to adjust screw 48 so as to allow a slow leak of refrigerant through the welding electrode during idle periods so as to hold the electrode at a low temperature ready for use.

Valve operating cable 47 passes over a pair of pulleys 50 and 51 and is connected to foot lever 16 so as to be pulled thereby to open the refrigerant valve at the time the electrodes are brought together to perform a welding operation. The interior of welding electrode holder 13 and electrode 52 may be identical in construction with that of electrode holder 14 and electrode 28 and the valve may be operated in a similar manner by cable 53 which passes over pulley 51 and is likewise connected to the foot lever 16. The connections to the refrigerating system are also similar.

Compressed refrigerant hose 33 is preferably centered within return hose 30 in some manner such as by coil springs 54 disposed at intervals between the two hoses. The compressed refrigerant from storage tank 27 is supplied to hoses 33 through normally open valve 55 and the inner pipe of header 22.

It will be obvious that a resistance welding apparatus is provided by the present invention which utilizes the welding electrode itself as the expansion valve of a refrigerating system. This results in a concentration of the maximum cooling effect at the head of the welding electrode where it is required. Thus the greater part of the heat absorption takes place within the welding electrode itself, and the expanding refrigerant, when it leaves the electrode, has already absorbed a considerable amount of heat and consequently has been brought nearer to room temperature. Therefore, the rest of the refrigerating system, exclusive of the welding electrode itself and possibly of the electrode holder, may be operated very close to room temperature so that little or no heat insulation will be required. In some cases, it may be desirable to apply a layer of heat insulating material over electrode holders 14 and 13 and possibly also over return hoses 30 to prevent loss of refrigerating effect and prevent condensation of moisture from the air on these parts of the system.

Since the compressed refrigerant supply pipe and hose are inside the refrigerant fluid return passage and in heat exchange relation therewith, if any refrigerating ability is retained by the expanded refrigerant, this aids in pre-cooling the liquid or compressed refrigerant before it reaches the expansion valve.

Since the high pressure hose and pipe carrying the liquid or compressed refrigerant is entirely surrounded by the return passage, if a leak occurs in the system it merely results in a short circuit of part of the refrigerant back to the compressor and hence the danger from escape of the refrigerant into the outer atmosphere where damage might result is very slight.

While a spiral heat exchange fin has been shown within the welding electrode, it is contemplated that this may be dispensed with in some cases or replaced by longitudinal fins or other forms of fluid guide passageways. It is also contemplated that in some cases the expansion valve need not be located at the bottom of the electrode but can be disposed at the top of pipe 36 or at an intermediate point although this arrangement may not be quite as efficient.

It will be apparent that the improvement of the present invention can readily be applied to present welding apparatus without introducing radical changes in its construction and, in fact, can if desired be adapted to function interchangeably with water cooling by merely providing valves at appropriate points to connect circulating water to the hoses 30 and 33 in place of the refrigerant fluid.

It will be noted that the opening of the expansion valve is synchronized with the welding operation thereby conserving the refrigerant when the apparatus is not in use and preventing over-cooling of the electrode which might otherwise result in water condensation and ice formation at the welding tip.

The refrigerating system may be disposed adjacent to the welding apparatus or might be located at a considerable distance, since the refrigerant supply and return hoses or pipes may be kept at room temperature or slightly below room temperature. It is also evident that a single refrigerating system may be connected to a whole battery of welding machines if desired, and that the system can be adapted to welding electrodes of other types such as roll or wheel welders and the like.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A welding machine comprising, in combination, a pressure exerting welding electrode, a holder supporting said electrode, said electrode and holder being internally hollow and together defining a closed chamber, a compressed refrigerant passage leading into said chamber, an expanded refrigerant return passage leading out of said chamber, and a refrigerant fluid expansion valve within said chamber, and valve control means extending into said chamber for controlling said valve.

2. A welding machine comprising, in combination, an elongated pressure exerting welding electrode having a recess in the back end thereof, a tubular shank secured to said back end and supporting said electrode, said electrode and shank together defining an elongated hollow chamber, a compressed refrigerant pipe extending through said chamber and into said electrode recess, a compressed refrigerant supply tube connected to said pipe, an expanded refrigerant return tube connected to said chamber, and a fluid expansion valve at the end of said pipe within said electrode recess.

3. A welding machine comprising, in combination, an elongated pressure exerting welding electrode having a recess in the back end thereof, a tubular shank secured to said back end and supporting said electrode, said electrode and shank together defining an elongated hollow chamber, a compressed refrigerant pipe extending through said chamber and into said electrode recess, a compressed refrigerant supply tube connected to said pipe, an expanded refrigerant return tube connected to said chamber, and the end of said pipe and the walls of said electrode recess co-operating to form a fluid expansion valve.

4. A welding apparatus comprising a pressure exerting welding electrode having a recess therein, and cooling means therefor comprising a fluid refrigerant supply pipe extending into said recess, said pipe and the walls of said recess co-operating to produce a valve for controlling said fluid.

5. A welding apparatus comprising a pressure exerting welding electrode having a recess therein, and cooling means therefor comprising a fluid refrigerant supply pipe extending into said recess, said pipe and the walls of said recess cooperating to produce a valve for controlling said fluid, and control means for moving said pipe to vary the size of said valve opening.

6. A welding apparatus comprising a pressure exerting welding electrode having a recess therein, a holder therefor, and cooling means for said electrode comprising a fluid refrigerant supply pipe extending into said recess and seating against the bottom of said recess to provide a control valve for said refrigerant, and a control lever mounted on said holder and operatively connected to said pipe to permit longitudinal movement thereof to adjust the spacing between the end of said supply pipe and the bottom of said recess.

7. A welding apparatus comprising a tubular welding electrode holder, a recessed welding electrode secured to one end thereof, a closure head secured to the other end thereof, said holder, electrode and head defining an elongated chamber, a compressed refrigerant supply pipe in said chamber and extending longitudinally thereof with one end seated in said electrode recess thereby forming a valve, a compressed refrigerant supply tube extending into said chamber and connected to said pipe, an expanded refrigerant return tube connected to said holder and communicating with said chamber, a refrigerating system supplying compressed refrigerant to said supply tube and withdrawing expanded refrigerant through said return tube, and a control plunger extending through said head for effecting longitudinal movement of said supply pipe to open and close said valve.

8. A welding apparatus comprising a tubular welding electrode holder, a recessed welding electrode secured to one end thereof, a closure head secured to the other end thereof, said holder, electrode and head defining an elongated chamber, a compressed refrigerant supply pipe in said chamber and extending longitudinally thereof with one end seated in said electrode recess thereby forming a valve, a compressed refrigerant supply tube extending into said chamber and connected to said pipe, an expanded refrigerant return tube connected to said holder and communicating with said chamber, a refrigerating system supplying compressed refrigerant to said supply tube and withdrawing expanded refrigerant through said return tube, and a control plunger extending through said head for effecting longitudinal movement of said supply pipe to open and close said valve, spring means normally pressing said plunger against said supply pipe and lever means outside said head for lifting said plunger against said spring pressure, and sealing means around said plunger to prevent escape of refrigerant.

9. A welding machine comprising a pair of cooperating pressure exerting welding electrodes and relatively movable support arms therefor, pressure control means for moving at least one of said arms to bring its electrode into pressure contact with work to be welded and cooling means for said electrodes comprising fluid supply and return passages for conveying fluid to and from said electrodes, a valve at each of said electrodes for regulating the flow of said fluid from said supply to said return passages, and valve control means under common control with said pressure control means for opening said valves when said movable electrode is brought into pressure contact with work to be welded.

10. A welding machine comprising a pressure exerting welding electrode and support means for moving said electrode into pressure applying contact with work to be welded, and cooling means for said electrode comprising fluid supply and return passages leading to and from said elctrode, and a valve at said electrode for regulating the flow of fluid from said supply to said return passage and common control means for operating said support means and said valve in synchronism to open said valve when pressure is applied to said work.

11. A welding machine comprising a pair of co-operating electrodes and relatively movable support means to bring said electrodes into clamping engagement with work to be welded, a welding current circuit for supplying welding current to said electrodes and a switch for opening and closing said circuit, and cooling means for said electrodes comprising fluid supply and return passages leading to and from said electrodes and valves at said electrodes for regulating the flow of fluid from said supply to said return passages, and common control means for said switch and valves to close said switch and open said valves in substantial synchronism.

12. A welding machine comprising a pair of co-operating electrodes and relatively movable support means to bring said electrodes into pressure engagement with work to be welded, an electric circuit for supplying welding current to said electrodes and a switch for opening and closing said circuit, cooling means for said electrodes comprising refrigerant fluid passages in heat exchange relation with said electrodes, valves in said passages for regulating the flow of refrigerant fluid therein, and common control means for said switch and valves to close said switch and open said valves in substantial synchronism and vice versa to conserve refrigerant when said electrodes are not in operation.

13. A welding machine comprising a welding electrode and means for pressing said electrode against work to be welded, a refrigerant fluid passage in heat exchange relation with said electrode and a valve in said passage, means to hold said valve partly open to permit a limited rate of expansion of refrigerant during idle periods and means to open said valve wider to permit increased cooling effect during welding.

14. In combination, a welding electrode and cooling means therefor comprising a refrigerant fluid passage in heat exchange relation with said electrode, a valve in said passage for regulating the flow of fluid therein, a control arm for controlling said valve and an adjustable stop to prevent full closure of said valve, whereby the fluid flow may be regulated to maintain the electrode at any desired temperature during idling periods.

15. In combination, a welding electrode and cooling means therefor comprising a refrigerant fluid passage in heat exchange relation with said electrode, a valve in said passage for regulating the flow of fluid therein, a spring urging said valve to closed position, a control arm for opening said valve against the force of said spring, and an adjustable stop to prevent full closure of said valve by said spring, whereby the fluid flow may be regulated to maintain the electrode at any desired temperature during idling periods.

16. Welding apparatus comprising a welding electrode having a recess therein, a cooling fluid supply pipe leading into said recess and capable of seating against a wall thereof to provide a fluid valve, and valve control means for moving said pipe into and out of seating position against the wall of said electrode to open and close the valve thus provided.

17. A welding system comprising, in combination, a pressure exerting welding electrode, a holder supporting said electrode, said electrode and holder being internally hollow and together defining a closed chamber, a liquid refrigerant pipe leading into said chamber, a vaporizing valve in said chamber fed by said pipe, a vaporized refrigerant return passage leading out of said chamber and means fed thereby for reliquifying, cooling and collecting said refrigerant and feeding said reliquified refrigerant back to said liquid refrigerant pipe, and a valve control means leading into said chamber for varying the opening of said valve.

CHESTER F. CARLSON.